United States Patent [19]

Uemura

[11] Patent Number: 4,599,546

[45] Date of Patent: Jul. 8, 1986

[54] WIPER DEVICE

[75] Inventor: Keiichi Uemura, Kariya, Japan

[73] Assignee: Nippondenso Co., Ltd., Kariya, Japan

[21] Appl. No.: 686,408

[22] Filed: Dec. 26, 1984

[51] Int. Cl.⁴ ............................................. H02P 1/04
[52] U.S. Cl. .................... 318/443; 318/444; 318/445; 318/446; 318/DIG. 2; 318/286
[58] Field of Search .............. 318/443, 444, 446, 445, 318/466, DIG. 2, 280–286, 289; 15/250.06, 250.12, 250.17

[56]  References Cited

U.S. PATENT DOCUMENTS 3,253,206  5/1966  Romanowski ....................... 318/466

Primary Examiner—William M. Shoop, Jr.
Assistant Examiner—Shik Luen Paul Ip
Attorney, Agent, or Firm—Cushman, Darby & Cushman

[57]  ABSTRACT

A wiper device has a reversible electric motor having an output shaft operatively connected to a reciprocally movable wiper blade. The electric circuit including motor armature is constructed such that, when a wiper switch is on, the motor shaft is reciprocally rotated in alternate directions within a predetermined angular range less than 360° to reciprocally drive the wiper blade and that, when the wiper switch is turned off, the motor shaft is rotated beyond the predetermined angular range to move the wiper blade to a rest position out of its wiping range.

7 Claims, 10 Drawing Figures

WIPER DEVICE

BACKGROUND OF THE INVENTION

1. Field of the Invention

The present invention relates to wiper devices for reciprocatingly wiping, for example, the rear or front windshield or head lamps of an automobile, the sight glasses of some industrial equipments and so forth. More particularly, the invention is concerned with a wiper device having a rise-up mechanism.

2. Description of the Prior Art

Wiper devices have been known, each of which has a mechanism which, when the wiper switch is turned off, lowers the wiper blades to a position below the lower end of their wiping stroke. When the wiper switch is turned on again, this mechanism operates to raise the blades up to the operating position before wiping is commenced. This mechanism, therefore, is generally referred to as a "rise-up mechanism". Usually, this rise-up mechanism is used in a concealed-type automotive wiper device which is adapted to conceal the wiper blades below the bonnet when the wiper device is not used. The rise-up mechanism is used also in a wiper device for a power-driven automotive rear windshield adapted to be raised and lowered by remote control. Namely, in order to permit a smooth upward and downward movement of the power-driven rear windshield, the rise-up mechanism usually keeps the wiper blades away from the rear windshield and puts them into contact with the rear windshield only when wiping becomes necessary. The rise-up mechanism is used also in various equipments having power-driven windows to keep the wiper blades below or above the area to be wiped so as not to hinder the movement of the window panels. Thus, the term "rise-up mechanism" should be interpreted to also include a mechanism which keeps the wiper blades at a position above the upper end of the wiping stroke, when the blades are not in operation.

An example of a rise-up mechanism is shown in the specification of U.S. Pat. No. 3,253,206. This mechanism has a crank arm connected to an output shaft driven by a wiper motor through a worm gear having a center offset from the axis of the output shaft, so that a crank pin provided on the crank shaft moves along a non-circular path so as to move, when the wiper switch is turned off, the wiper blades to a position out of the area wiped by the wiper blades during the wiping operation. This rise-up mechanism, however, requires a complicated construction including a special eccentric blade driving mechanism and a solenoid-actuated clutch for controlling the switch.

Under this circumstance, there is an increasing demand for a wiper device having a rise-up mechanism of a simple construction.

SUMMARY OF THE INVENTION

Accordingly, an object of the invention is to provide a wiper device which, when the wiping is not necessary, can hold the wiper blades out of the wiping area, by simply changing the electric circuit and component parts and without substantial change in the mechanical construction of the conventional wiper device.

According to the present invention, there is provided a wiper device having a wiper blade which is adapted to be reciprocally driven by the torque of a motor to wipe and clean a predetermined wiping area of a window surface. This wiper blade is adapted to be moved out of the wiping area to a rest position when the wiping operation is unnecessary. This wiper device includes:

a reversible motor, and a wiper motor unit incorporating the reversible motor.

An output shaft of the wiper motor unit is driven by said motor and adapted to rotate forwardly and rearwardly within an angular range not greater than 360°.

A wiper blade is operatively connectd to the output shaft and adaptd to be driven reciprocally by the output shaft.

A first switch device is also provided for detecting the rotation of the output shaft and has an operation which is adapted to be reversed at one of the reversing positions of the reciprocal motion of the wiper blade.

A second switch device is adapted to detect the rotation of the output shaft of the wiper motor unit and to operate when the wiper blade has reached a predetermined rest position.

Also a manually operable wiper switch has switching positions to emit instructions for commencement and stoppage of the wiping operation, respectively.

A motor controlling switch device is operable in response to a wiper-commencement instruction of the wiper switch to cause the motor to rotate in one of the two directions, one direction being dependent on the operation of said first switch, the motor controlling means being also responsive to a wiper-stoppage instruction of the wiper switch to allow the operation of the motor to be continued in one direction irrespective of the operation of the first swtich, the said motor controlling switch being further operative to stop the motor when the second switch means detects arrival of said wiper blade to said rest position.

The above and other objects, features and advantages of the invention will become clear from the following description with reference to the accompanying drawings.

DESCRIPTION OF THE PREFERRED EMBODIMENTS

Figure 1:
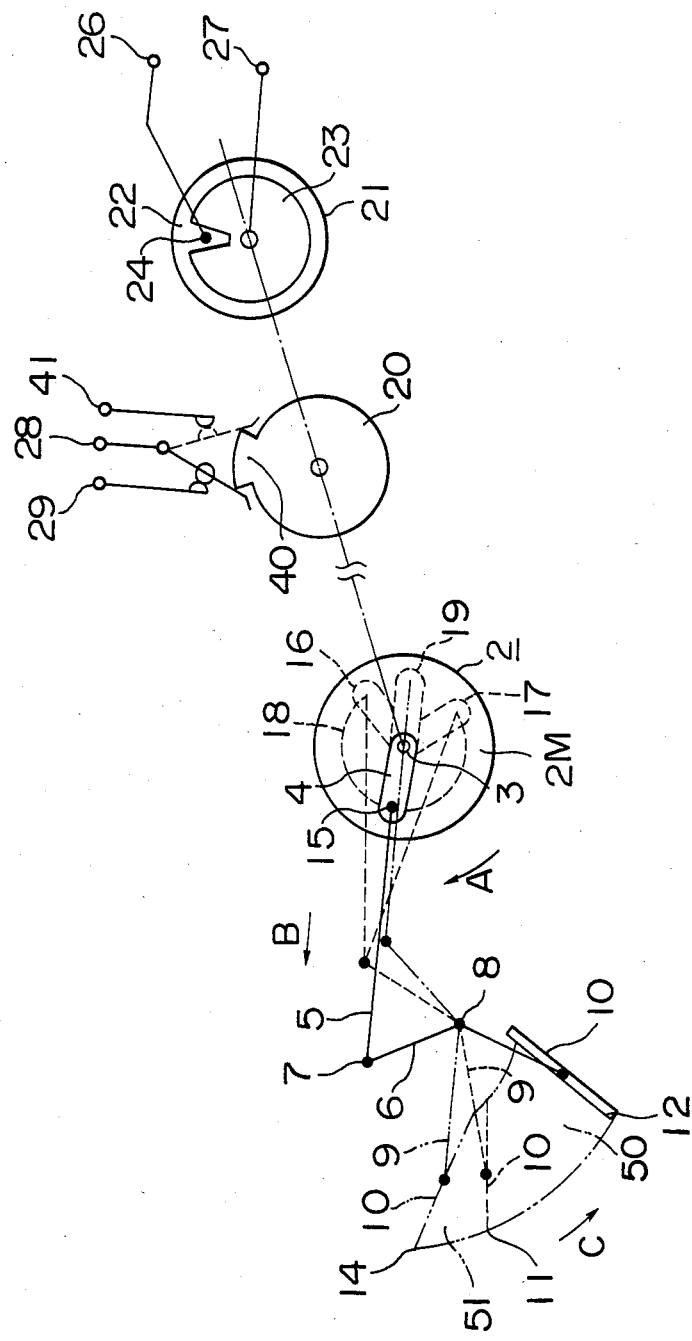
FIG. 1 is a schematic illustration of a link motion mechanism incorporated in an embodiment of the wiper device in accordance with the invention.
Figure 2:
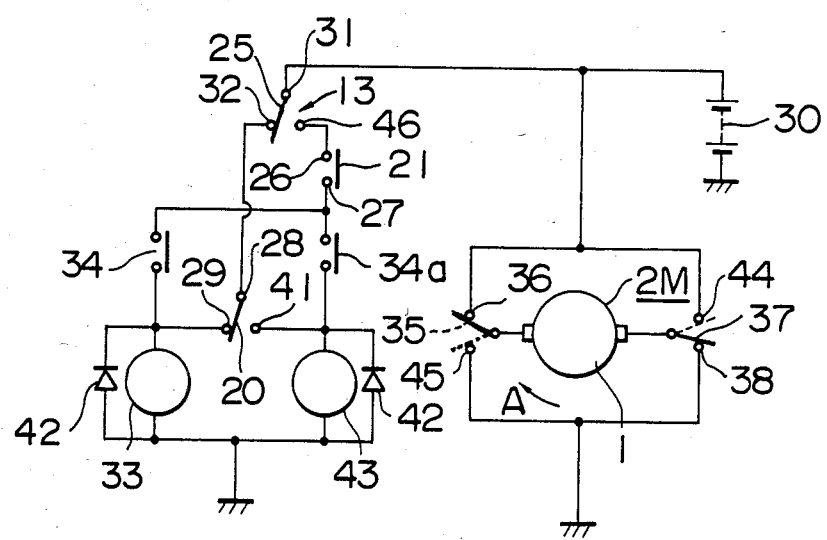
FIG. 2 is an electric circuit diagram of the embodiment shown in FIG. 1.

Referring to FIGS. 1 and 2, a first embodiment of the wiper device of the invention has a wiper motor 2M which is, as is well known, a D.C. motor having an armature 1 and a permanent magnet serving as a field magnet. The motor 2M cooperates with a reduction gear having a worm gear and a worm wheel to form a wiper unit 2 which is known per se.

A shaft 3 to which the worm wheel is connected constitutes the output shaft of the wiper unit 2. To the output shaft 3 is connected a crank arm 4 which in turn is drivingly connected to a link rod 5 such that one full revolution of the crank arm 4 causes one reciprocatory stroke of the link rod 5. A lever 6 is coupled to the link rod 5 through a pin 7. The lever 6 converts the reciprocatory swinging motion of the link rod 5 into a reciprocatory rotary motion of a pivot shaft 8 to which a wiper arm 9 is connected in a known manner.

The wiper arm 9 is composed of a retainer and an arm piece and holds the wiper blade 10 which is urged against the windshield surface 50 by means of a spring at a moderate pressure for effectively wiping and cleaning the windshield over an area between a position 11 and a position 12. When a wiper switch 13 shown in FIG. 2 is off, the wiper blade 10 is kept away from the windshield surface and rests at a rest position 14 on a part of the vehicle body 51.

According to the invention, this operation of the wiper blade 10 is achieved by alternately reversing the output shaft 3 of the wiper motor unit 2.

Namely, the ouptut shaft 3 of the wiper motor does not rotate unidirectionally, unlike the conventional wiper device, but is reversible. More specifically, a pin 15 through which the crank arm 4 is connected to the link rod 5, is rotated from a position 19 or 17 in the direction of the arrow A to a stop position 16. When the pin 15 has reached this position 16, the power supply to the motor 2M of the wiper unit 2 is stopped and the armature is short-circuited to put an electric brake into effect. Then, the armature is supplied with electric current in the reversed direction so that the crank arm 4 is moved from the position 16 back to the position 17. The crank arm 4 is thus reciprocatingly moved between the two positions 16 and 17 so that the wiper blade 10 reciprocatingly wipes the windshield surface 50 over the area between the positions 11 and 12.

When the wiper switch 13 is turned off while the crank arm 4 is moving in the direction of, for example, arrow A past a position 18, the pin 15 of the crank arm 4 continues to move in the direction of the arrow A beyond a position 16 and is stopped at the position 19. Consequently, the wiper blade 10 is moved out of the wiping area between the positions 11 and 12 to the rest position 14 on the part of the vehicle body 51 beyond the windshield surface.

This operation of the wiper device can be summarized as follows:

During the wiping operation, the wiper device drives the wiper blade 10 reciprocatingly over a first predetermined rotation angle $\theta_1$ smaller than 360° so as to allow the wiper blade 10 to wipe the area between the position 11 and the position 12. Although not shown, the angle $\theta_1$ corresponds to the angle formed between the position 17 and the position 16. When the wiper switch is turned off, the wiper blade 10 is stopped after the output shaft 3 has been rotated over a predetermined second angle $\theta_2$ which is greater than the first predetermined angle $\theta_1$. Although not shown, the second predetermined angle $\theta_2$ is the angle formed between the position 16 and the position 19, i.e., the sum of the first angle $\theta_1$ and the angle of movement of the crank arm from the position 19 to the position 17 in the direction of the arrow A.

Description will be made hereinunder as to the details of the electric circuit and mechanism employed for achieving the above-described operation.

Referring to FIG. 1, the wiper device of the invention has a cam plate 20 adapted for rotation as a unit with the output shaft 3 of the wiper motor 2M and constituting a switching means for detecting the wiper blade reversing positions, and a slide rotary switch 21 also rotatable as a unit with the output shaft 3 and constituting a switching means for detecting the rest position. The slide rotary switch 21 is formed by a dics-shaped conductor plate 23 having a radial slit 22 and a brush 24 adapted to slide on the conductor plate 23.

The arrangement is such that, when the pin 15 on the crank arm 4 comes into the position 19, the brush 24 of the rotary switch 21 falls into the slit 22 so that the rotary switch 21 interrupts the supply of electric power through the conductor plate 23 and the brush 24.

Figure 3:
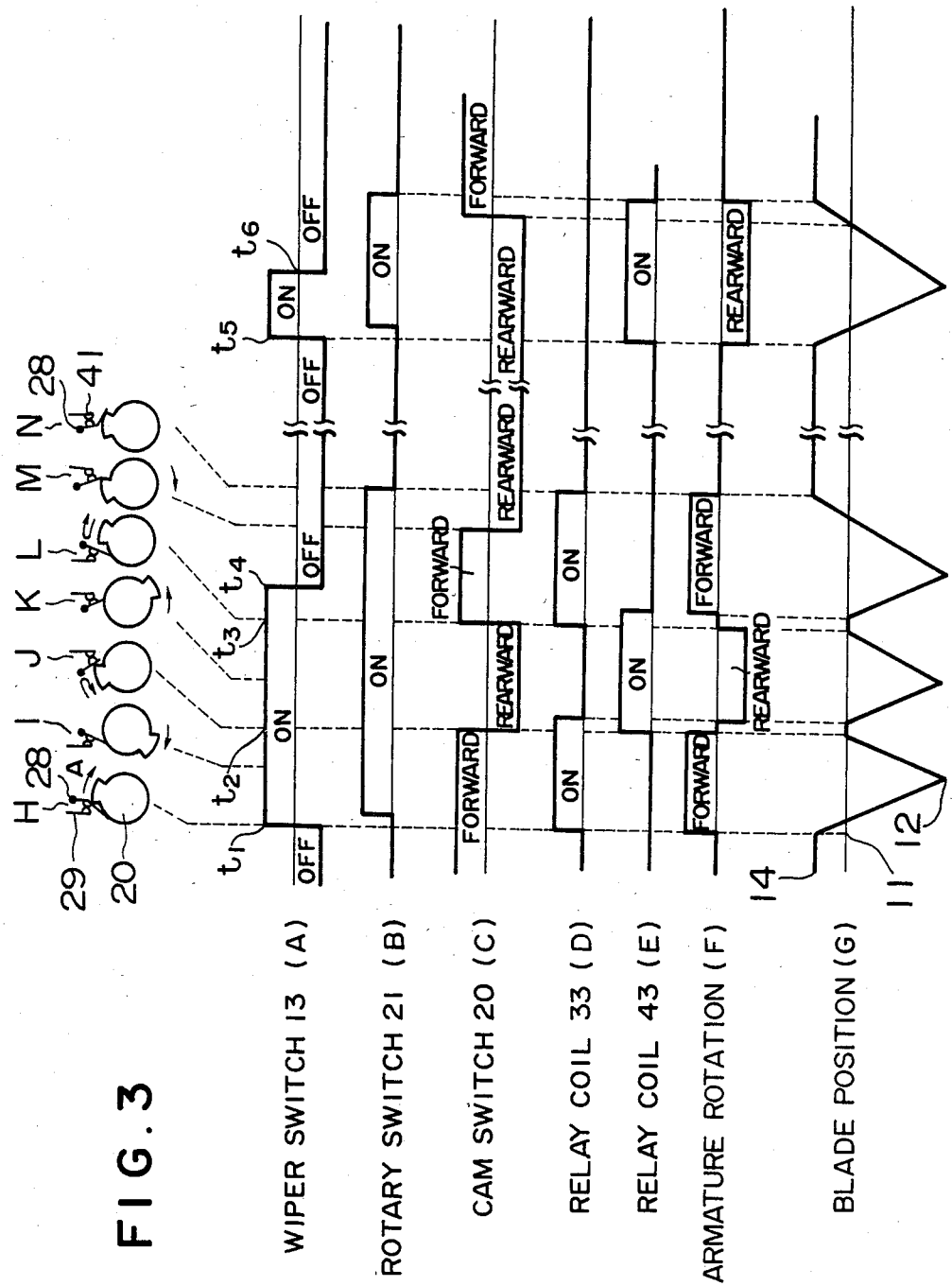
FIG. 3 is a chart illustrating the operation of the circuit shown in FIG. 2.
Figure 4:
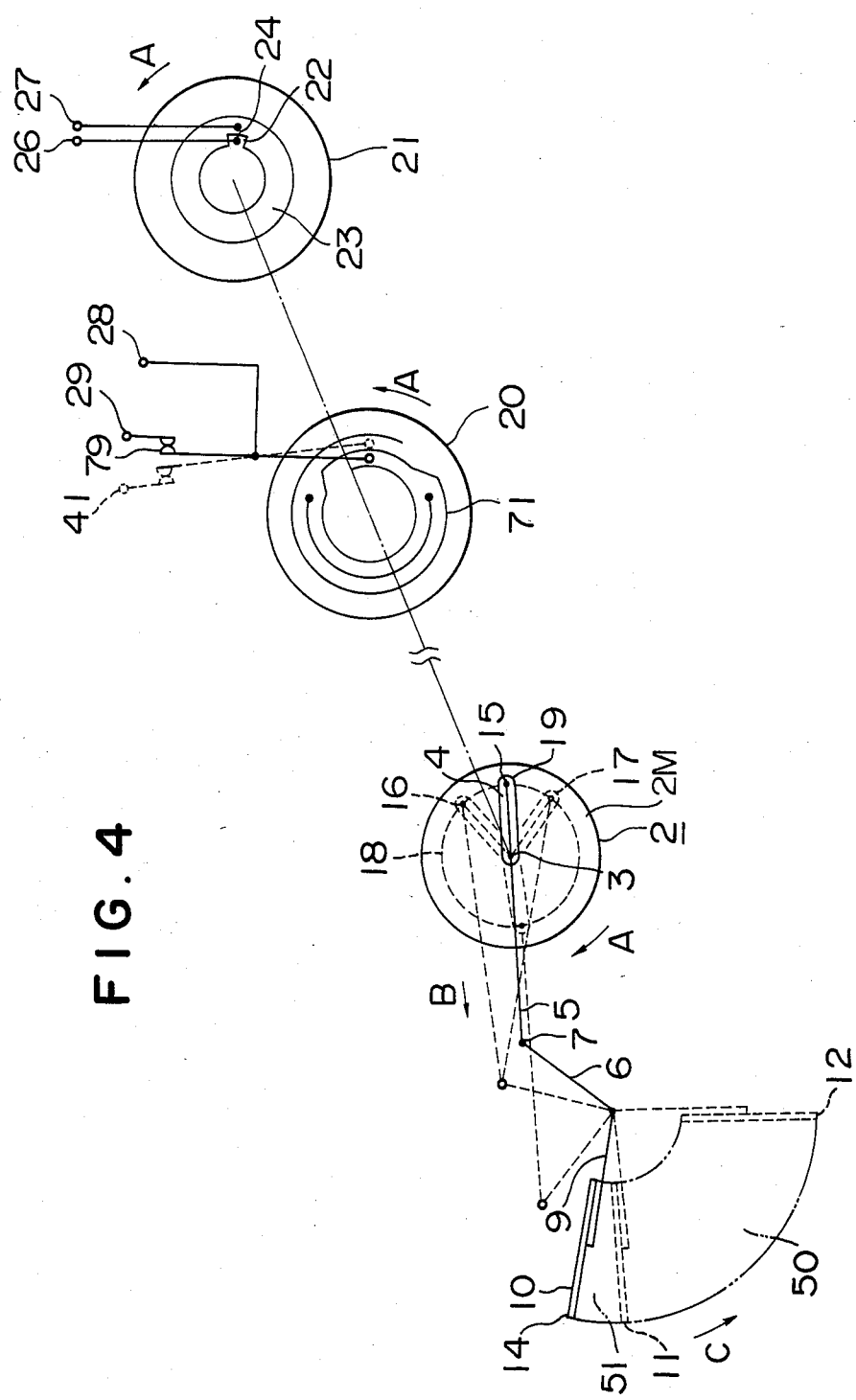
FIG. 4 is a schematic illustration of a link motion mechanism employed in a second embodiment of the wiper device of the invention.

FIG. 3 is a chart illustrating the operation of the circuit shown in FIG. 2 and the operation of the mechanical parts associated with the electric circuit. More specifically, a section A of FIG. 3 shows the operation of the wiper switch 13. When the switch 13 is turned to connect a movable contact 25 to the left terminal 32 as viewed in FIG. 2 (this state will be referred to as "on" state hereinunder), the waveform appears on the upper side of a neutral line. Conversely, when the switch 13 has been turned to the right side (this state will be referred to as "off" state hereinunder) as viewed in FIG. 2, the waveform appears on the lower side of the neutral line.

A section B of FIG. 3 shows the timing of turning on and off the rotary switch 21, while a section C shows whether the selector 28 of the cam switch 20 is selecting the forward contact 29 or the rearward contact 41. Sections D and E of FIG. 3 show the states of relay coils 33 and 43, while a section F shows the direction of rotation of the armature 1.

Assume here that the wiper switch 13 is turned from the "off" state to the "on" state at a moment $t_1$; since, at this moment, the brush 24 is positioned in the insulating slit 22 in the rotary switch 21 as shown in FIG. 1, the conductor plate 23 and the brush 24 are out of electric contact with each other. That is, the terminals 26 and 27 are electrically disconnected from each other. At this moment, the cam switch 20 is in the state H shown in FIG. 3, so that its movable contact 28 is making contact with the stationary contact 29. Namely, as shown in FIGS. 1 and 2, the cam switch 20 is in the position to close a circuit for energizing the relay coil 33. Therefore, the relay coil 33 is energized by the electric power which is supplied from a battery 30 through contacts 31 and 32 of the wiper switch 13 and through contacts 28 and 29 of the cam switch 20. Consequently, a relay contact 34 is turned on and a relay contact 35 is moved out of contact with the lower contact (contact 45) into contact with the upper contact (contact 36) as viewed in FIG. 2, so that an electric current flows from the battery 30 to the ground through the relay contacts 36 and 35, armature 1 of the motor 2M and relay contacts 37 and 38, whereby the motor 2M is energized to rotate its shaft in the direction of the arrow A. The shaft in turn drives, through a reduction gear (not shown), the cam switch 20, the rotary switch 21 and the crank arm 4, respectively, in the direction of the arrow A.

Consequently, the link rod 5 is moved in the direction of the arrow B so that the wiper blade 10 is moved in the direction of the arrow C from the rest position 14 through the position 11, commencing the wiping of the windshield surface 50. Thus, the shaft of the motor 2M is rotated in the forward direction indicated by the arrow A as will be seen from section F in FIG. 3, so that the wiper blade 10 moves from the position 14 towards the position 12.

When the wiper blade 10 has reached the lower stroke end 12 as viewed in FIG. 3, the wiper blade 10 starts to move in the reverse direction, i.e., upwardly in the direction opposite to the arrow C in FIG. 1. At the end of this stroke, the cam switch 20 is turned from a state I to a state J shown in FIG. 3. It will be seen that sections H to N of FIG. 3 schematically show the successive states of the cam switch 20. When the cam switch 20 is brought into the state shown by section J, the movable contact 28 is urged rightward to the position shown by broken line by the action of the projected end 40 (see FIG. 1) of the cam, so that the contact 28 is separated from the stationary contact 29 and brought into contact with the stationary contact 41. As a result of the separation of the movable contact 28 from the stationary contact 29, the power supply to the relay coil 33 through the contacts 28 and 29 is interrupted, but the relay coil 33 is still energized by the fly-wheel current which flows through one of the fly-wheel diodes 42 so that the movable contact 36 remains in contact with the stationary contact 35. On the other hand, the relay coil 43 is energized as a result of the contact between the movable contact 28 and the stationary contact 41 of the cam switch 20 so that the relay contact 37 is brought into contact with the contact 44. At the same time, the contact 34a constituting the self-maintaining switch is closed. As a result, the armature 1 is short-circuited through the contacts 35 and 36 and the contacts 44 and 37 so that an electric brake is put into effect to quickly decelerate the wiper blade 10 at a moment $t_2$ around which the wiper blade 10 has reached the upper stroke end 11 shown in FIG. 3. Consequently, the wiper blade 10 is braked forcibly.

At the next moment, the fly-wheel current flowing through the diode 42 and the coil 33 is attenuated so that the contact 34 constituting the self-maintaining switch is opened and the movable contact 35 leaves the stationary contact 36 into contact with the stationary contact 45.

Consequently, the electric current is supplied from the battery 30 to the ground through the contacts 44 and 37, the armature 1 and the contacts 35 and 45, thus causing the motor 2M to be reversed to thereby drive the wiper blade 10 from the upper end 11 towards the lower end 12 of its wiping stroke.

Then, at a moment $t_3$ at which the wiper blade 10 has reached the upper stroke end 11 again, the cam switch 20 takes the state shown in section L of FIG. 3 so that the motor 2M is reversed again.

This operation is repeated cyclically so that the wiper blade 10 reciprocatingly wipes the windshield surface 50.

When the wiper switch 13 is turned off at a moment $t_4$ during the course of wiping, the wiper device of the invention operates in a manner explained hereinunder.

During the period immediately before the moment $t_4$, the relay coil 33 is still energized so that the armature 1 of the motor 2M is rotating forwardly, i.e., in the direction of the arrow A and the wiper blade 10 is substantially at the midst of its travel from the upper stroke end 11 to the lower stroke end 12 as viewed in FIG. 3.

At the moment $t_4$, if the wiper switch 13 is turned off the electric current flows from the battery 30 to the relay coil 33 through the contacts 31 and 46 of the wiper switch 13, the contacts 26 and 27 of the rotary switch 21 and the relay contact 34, thereby to keep the relay coil 33 energized. As a result, the wiper blade 10 goes on to move towards the lower stroke end 12 and is then reversed to move towards the upper stroke end 11.

When the wiper blade 10 has come to a position close to the upper stroke end 11, the movable contact 28 of the cam switch 20 is brought into contact with the stationary contact 41 of the cam switch 20 as shown by the section M of FIG. 3 but the motor 2M continues to operate forwardly in the direction of the arrow A. As a result, the projection 40 on the cam switch 20 greatly deflects the movable contact 28, as shown by section N of FIG. 3. This, however, does not cause any damage or trouble in the cam switch 20 because the movable contact 28 has a resiliency which is sufficient to sustain the deflection.

Since the motor 2M continues its operation, the wiper blade 10 is moved beyond the upper stroke end 11, i.e., beyond the windshield surface 50 onto the part 51 of the vehicle body and the pin 15 of the crank arm 4 connected to the wiper motor 2M reaches the position 19 shown in FIG. 1. At this time, the brush 24 of the rotary switch 21 is moved into the insulating slit 22, so that the terminals 26 and 27 of the rotary switch are separated from each other, thereby interrupting the supply of the electric power from the battery 30.

As a result, the relay contact 35 is moved apart from the contact 36 and is brought into contact with the contact 45. In consequence, the armature 1 is braked and stopped due to the electric braking effect because the armature 1 is short-circuited through the contacts 38 and 37 and the contacts 35 and 45.

At a moment $t_5$, if the wiper switch 13 is turned on again to bring its movable contact 31 into contact with the stationary contact 32, the wiper blade 10 is moved from the rest position 14 towards the lower stroke end 12 past the upper stroke end 11. Then, when the wiper switch 13 is turned off at a moment $t_6$, the wiper blade 10 is moved to the rest position 14 so that it may rest at this position.

In the described embodiment of the wiper device of the invention, the armature 1 of the motor 2M is driven reciprocatingly in one and the other directions alternatingly and repeatedly so as to reciprocatingly drive the wiper blade 10. The alternating reversing of the armature 1 of the motor 2M is effected by single-pole double-throw switch including the relay contacts 35 and 37 at both sides of the armature 1 so that the electric current from the battery 30 flows through the armature 1 in alternating directions past these relay contacts 35 and 37 alternatingly. In addition, when the motor 2M is reversed, the relay contacts are switched to short-circuit the armature 1 so that electric braking is applied to effectively and noiselessly reverse the motor.

In sections D and E of FIG. 3, the waves "ON" represent the facts that respective relay coils 33 and 43 are energized, while waves "FORWARD" and "REARWARD" appearing in the section F of FIG. 3 indicate, respectively, the forward rotation, i.e., the rotation in the direction of the arrow A, and rearward rotation counter to the arrow A.

Another embodiment of the wiper device of the invention will be described hereinunder with reference to FIGS. 4 to 10, in which the same reference numerals are used to denote the parts which are the same as or equivalent to those shown in FIG. 1.

Figure 5:
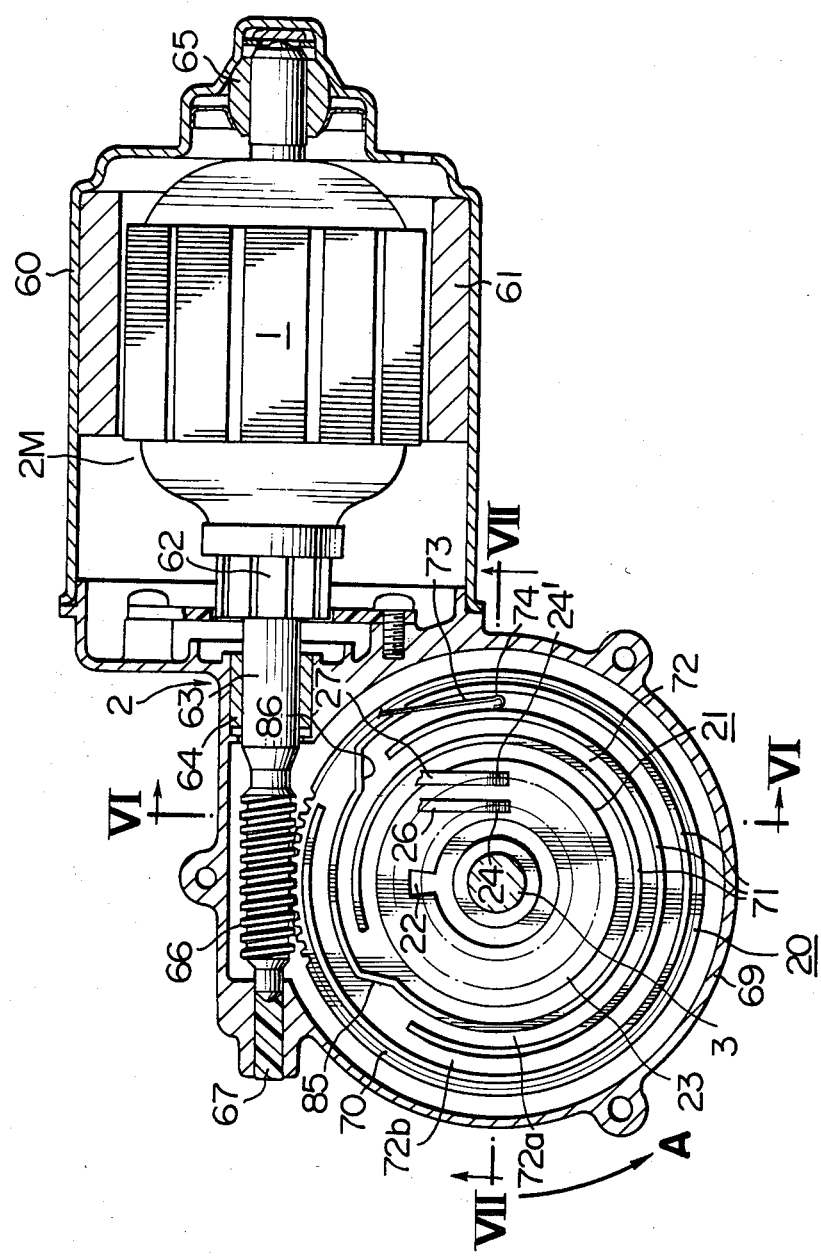
FIG. 5 is a partly sectional view of a wiper unit including a rotary switch mechanism employed in a second embodiment of the invention.
Figure 6:
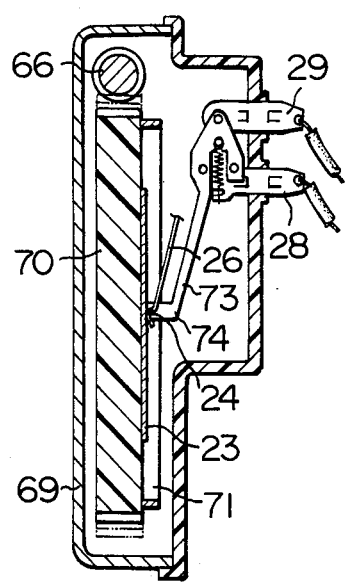
FIG. 6 is a sectional view of a rotary disc plate of the switch mechanism taken along line VI—VI in FIG. 5.
Figure 7:
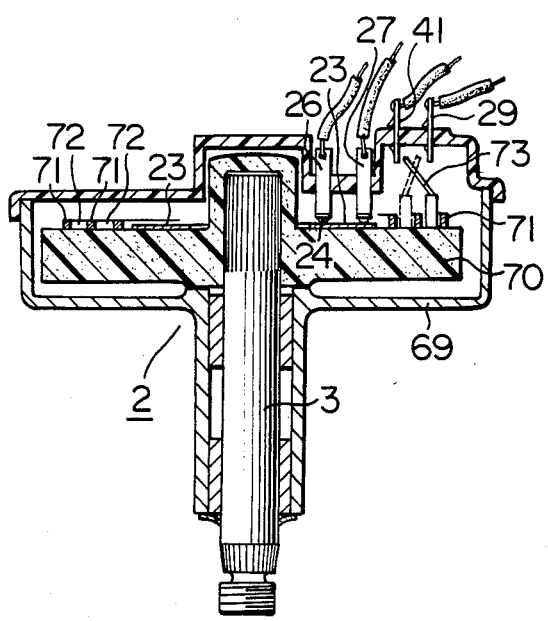
FIG. 7 is an axial sectional view of the rotary disc plate taken along line VII—VII in FIG. 5.
Figure 8:
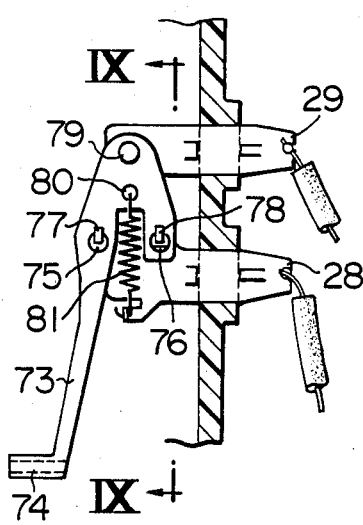
FIG. 8 is an enlarged partly sectional fragmentary view of the switch mechanism.

Referring to FIG. 5, this embodiment of the wiper device has a motor 2M having a motor housing 60 which accommodates parts such as field magnets 61, an armature 1, a commutator 62 and an armature shaft 63. The armature shaft 63 is supported at its both ends by bearings 64 and 65 and is provided at one end thereof with a worm 66. The worm 66 extends through a bore formed in a gear housing 69. The open end of the bore is plugged with a plastic member 67 which is intended to serve as a thrust bearing for a thrust load acting on the armature shaft.

The motor housing 60 and the gear housing 69 are fixed to each other. The gear housing 69 accommodates a worm wheel gear 70 meshing with the worm 66 mentioned before. The worm gear 70 is made of a plastic material and is formed integrally with a central rotary shaft 3 by insertion molding. As will be seen from FIG. 7, the rotary shaft 3 is rotatably carried by the gear housing 69 so as to constitute the output shaft 3 of the wiper motor 2M. As in the case of the first embodiment explained in connection with FIGS. 1 and 4, a crank arm (not shown) is secured to the output shaft 3.

An annular conductor plate 23 made of a thin copper sheet is attached to one end face of the worm gear 70. A radial slit 22 is formed by cutting the annular conductor plate 23 radially outwardly from the inner periphery of the conductor plate 23.

Contactors 26 and 27 having brushes 24 and 24' are placed on the annular conductor plate 23 so as to slide along paths or tracks indicated by one-dot-and-dash lines. The arrangement is such that the electric connection between the contactors 26 and 27 is disconnected only when the brush 24 carried by the contactor 26 is positioned in the slit 22.

A plurality of spiral or arcuate ridges 71 are integrally formed on and axially protrude from the end face of the worm gear 70 so as to surround the conductor plate 23. As will be seen from FIG. 5, the ridges 71 extend in three substantially concentric arcuate or spiral rows of different diameters such that grooves 72 are formed between adjacent rows. A finger 74 of a movable contact lever 73 extends into the groove 72. As will be best seen from FIG. 8, the movable contact lever 73 is made of a plate of a conductive material such as copper and is provided at the central portion thereof with two holes 75 and 76 which receive claws 77 and 78 of the movable contact 28. Therefore, the movable contact lever 73 is rockable around the fulcrums constituted by the claws 77 and 78 of the movable contact terminal 28. The rocking movement of the movable contact lever 73 causes the finger 74 on the front end thereof and the movable contact 79 on the rear end thereof to move in the direction normal to the plane of FIG. 8. This in turn causes the movable contact 79 to selectively contact with a contact point 29a of the stationary contact 29 and a contact point 41a of the stationary contact 41, as will be seen from FIG. 9.

Figure 9:
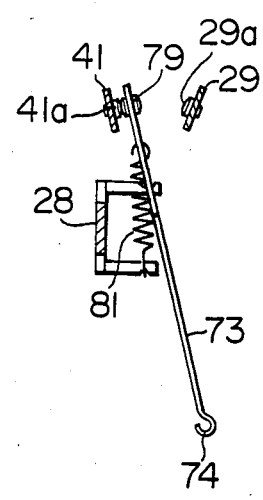
FIG. 9 is a sectional view taken along line IX—IX in FIG. 8.

A tension spring 81 is stretched between the hole 80 of the movable contact lever 73 and the terminal of the movable contact 28. As shown in FIG. 9, the force for resiliently urging the movable contact 79 against the stationary contact points 29a or 41a on the stationary contacts 29 or 41 is produced by the spring.

As shown in FIG. 5, the finger 74 on the end of the lever 73 is guided and driven by the ridges 71 formed on one end face of the worm gear 70 so that the movable contact 79 shown in FIG. 9 makes contact with one or the other of the stationary contact points 41a and 29a.

This second embodiment has an electric circuit which is identical to that of the first embodiment explained before.

The operation of this embodiment will be described hereinunder with specific reference to FIG. 10 which is a chart illustrating the operation.

Figure 10:
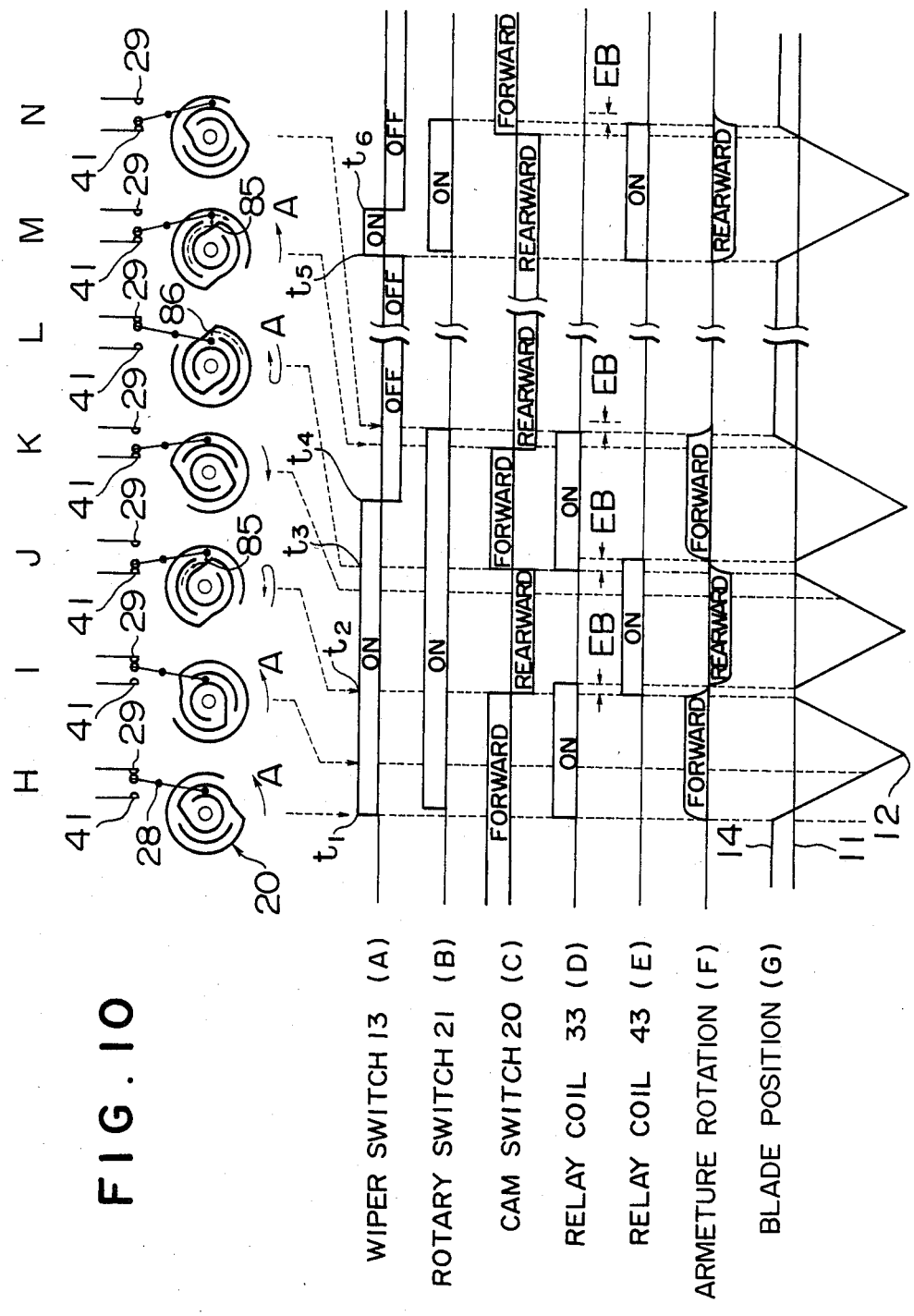
FIG. 10 is a chart illustrating the operation of the second embodiment.

Comparison between FIG. 3 and FIG. 10 will show that the main point of difference between the first and second embodiments resides in the construction of the cam switch 20. The following description of operation of the second embodiment, therefore, will be focussed mainly on the operation of the cam switch 20. Sections H, I, J, K, L, M and N of FIG. 3 show different states of the cam switch 20 during the operation thereof. More specifically, the section H shows the state in which the terminals 28 and 29 are contacting each other for forward driving of the wiper blade, the section I shows also the state for forward driving and the section J shows the state immediately after the switching from the forward driving to the rearward driving. The section K shows the state of the cam switch for the rearward driving, while the section L shows the state immediately after the switching from the rearward to the forward driving. The sections H, I, J, K, L, M and N of FIG. 10 show the states of the cam switch 20 which are the same as those in FIG. 3.

Referring to FIG. 10, when the power switch 13 is turned from the "off" state to the "on" state at a moment $t_1$, the armature 1 of the motor 2M starts rotation in the direction of the arrow A as in the case of the first embodiment explained in connection with FIG. 3. As a result, the cam switch schematically shown in the upper part of FIG. 10 starts rotation in the direction of the arrow A from the state shown in the section H to the state shown in the section I. The cam switch continues to rotate and comes to the state shown in the section J at a moment $t_2$. In this state, the finger 74 of the movable contact lever 73 is urged from the inner groove 72a into the outer groove 72b by the first non-circular portion, i.e., cam section 85 of the ridge 71 in the cam switch shown in FIG. 5. In consequence, the movable contact lever 73 rocks around the claws 77 and 78 of the movable contact 28 shown in FIG. 8 so that the movable contact 79 is moved apart from the stationary contact point 29a and brought into contact with the stationary contact point 41a.

In the state shown in the section J, therefore, the cam switch forms the circuit for rearward driving of the armature 1. Therefore, the motor 2M is reversed as in the case of FIG. 3 so that the armature 1 rotates in the direction opposite to the arrow A. A further rotation of the armature 1 of the motor 2M brings the cam switch into the state shown in the section K of FIG. 10. In this state, the cam switch maintains the connection for the rotation of the armature in the same direction, i.e., the direction opposite to the direction of the arrow A.

Then, at a moment $t_3$, the cam switch takes the state shown in the section L of FIG. 10 in which the finger 74 of the movable contact lever 73 is urged from the outer groove 72b into the inner groove 72a by the second non-circular portion, i.e., a cam section 86 (see FIG. 5) of the ridge 71 in the cam switch 20. Therefore, the cam switch maintains the connection for the forward driving of the motor 2M after the moment $t_3$. This operation is repeated so that the wiper blade 10 wipes the windshield surface 50.

When the wiper switch 13 is turned off at a moment $t_4$, this embodiment of the wiper device operates in a manner explained below. Namely, the relay coil 33 is kept energized despite the turning off of the wiper switch 13 at this moment, as in the case of FIG. 3. After a while, the cam switch 20 comes to take the state as shown in the section M of FIG. 10 in which the finger 74 of the movable contact lever 73 contacts the first cam section 85 of the ridge 71 facing the inner groove 72a so that the cam switch 20 is switched over to form the connection for the reversing of the motor 2M. In this state, however, the motor 2M goes on to rotate in the direction of the arrow A because the relay coil 33 remains energized. Therefore, the cam switch 20 comes to take the state shown in the section N of FIG. 10. Then, when the brush 24 of the rotary switch 21 comes into the insulating slit 22, the electric braking effect is caused as in the case of FIG. 3 to forcibly brake and stop the motor 2M.

Referring to FIG. 2, in both embodiments of the invention, the electric brake is put into effect when the movable contact 37 makes contact with the stationary contact 38 while the movable contact 35 is making contact with the stationary contact 45. This state is obtained when the relay coils 33 and 43 are both deenergized. The electric brake is put into effect also when the relay coil 43 is energized to allow the movable contact 37 to contact with the stationary contact 44 while the relay 33 is also energized to keep the movable contact 35 in contact with the stationary contact 36, i.e., when the relay coils 33 and 34 are both energized simultaneously. In FIG. 10, the periods in which such electric brake is put into effect are indicated by arrows EB (Electric braking).

In the embodiments described hereinbefore, a link rod 5 is used in combination with the crank arm 4 and the lever 6 as the power transmission means. This form of the power transmission means, however, is not exclusive and may be modified such that the rotation of the motor output shaft 3 is transmitted to the wiper arm by a sector gear fixed to the motor output shaft and a cooperating gear fixed to the wiper arm. The invention can apply also to such a system as using a cable instead of the link rod.

Furthermore, the rotary switch 21, which is used in the described embodiments as the wiper rest position detecting means operative to emit a signal upon detection of the rest position of the wiper blade, may be substituted by limit switches of the self-maintaining type.

In the described embodiments, a mechanism including the cam switch 20 is used as the switch means for detecting the reversing position of the wiper blade so as to be reversed during the forward or rearward operation of the wiper motor. This switching means, however, may be constituted electrically by the combination of a simple switch means and a memory means such as a flip-flop circuit and a self-maintaining circuit.

It is possible even to drive the wiper arm by the output shaft 3 of the motor 2M directly, i.e., without using any intermediary transmission means.

As has been described, the wiper device of the invention has a wiper blade 10 which wipes a predetermined area of a windshield surface as it is reciprocatingly swung over a first predetermined angle $\theta_1$ which is smaller than 360°. When the wiper switch is turned off, the wiper blade 10 is stopped only after the output shaft 3 has been rotated a second predetermined angle $\theta_2$ greater than the first predetermined angle $\theta_1$ so that the wiper blade 10 can rest at a position beyond the area to be wiped. This operation, which may be referred to as the "blade rise-up" or "blade down" operation, can be attained by the arrangement in accordance with the invention which can be realized by a minor change of the electric circuit of a conventional wiper device without necessitating substantial change or modification in the mechanical arrangement. Namely, the solenoid-actuated clutch mechanism and the special eccentric rotary mechanism, which are essential in the conventional wiper device having the "rise-up" function can be eliminated to assure that the cost of production of the wiper device of the kind described can be reduced remarkably.

This in turn permits the application of the "rise-up" function to various wiping systems which hitherto could not be equipped with such a function due to restrictions from the view point of cost. For instance, the invention can be worked in the form of a stowing type wiper device for an automotive front windshield in which the wiper blades are usually stowed so as not to restrict the operator's view, in the form of an automotive head-lamp wiper system which does not reduce the quantity of light projected from the head-lamps, or in the form of a wiper system for an automotive rear windshield in which the wiper blades are usually concealed so as not to hinder the opening and closing of the rear windshield.

What is claimed is:

1. A wiper device having a wiper blade adapted to be reciprocally driven by the torque of a motor to wipe and clean a predetermined wiping area of a window surface, said wiper blade being adapted to be moved out of said wiping area to a final rest position when wiping operation is unnecessary, said wiper device comprising:
   a reversible motor;
   a wiper unit incorporating said reversible motor;
   an output shaft of said wiper unit driven by said motor and adapted to rotate forwardly and rearwardly within an angular range not greater than 360°;
   a wiper blade operatively connected to said output shaft and adapted to be driven reciprocally by said output shaft;
   first switch means for detecting the rotation of said output shaft and having an operation which is adapted to be reversed at at least one reversing position of the reciprocal motion of said wiper blade;
   second switch means adapted to detect the rotation of said output shaft of said wiper unit and to operate when said wiper blade reaches adjacent said final rest position;
   a manually operable wiper switch having switching positions to emit instructions for commencement and stoppage of the wiping operation, respectively; and
   motor controlling switch means operable in response to a wiper-commencement instruction of said manually-operable wiper switch to cause said motor to rotate in one of two directions, said one direction being dependent on the operation of said first switch means, said motor controlling switch means being also responsive to a wiper-stoppage instruction of said manually-operable wiper switch to allow the operation of said motor to be continued in said one direction irrespective of the operation of said first switch means, said motor controlling switch means being further operative to stop said motor when said second switch means detects arrival of said wiper blade adjacent to said final rest position.

2. A wiper device according to claim 1, wherein said motor is a D.C. motor, said motor controlling switch means includes at least a pair of relay contacts for switching over the direction of the electric current in said motor, at least one pair of relay coils for driving respective relay contacts and at least one pair of self-maintaining switch means for forming paths of electric current supplied to respective relay coils when said relay coils are energized.

3. A wiper device according to claim 2, wherein the wiper stoppage instruction position of said wiper switch, said second switch means, one of said self-maintaining switch means and one of said relay coils are electrically connected in series to form a first series circuit, and the wiper commencement instruction position of said wiper switch, said first switch means and one of said relay coils are electrically connected in series to form a second series circuit.

4. A wiper device according to claim 3, wherein a fly-wheel current path including a fly-wheel diode is connected in parallel to each of said relay coils.

5. A wiper device according to claim 1, wherein said first switch means includes a cam having a projection rotatable with the output shaft of said wiper motor unit and a change-over switch adapted to be actuated by said cam.

6. A wiper device according to claim 1, wherein said first switch means includes a rotary disc having a groove and rotatable with the output shaft of said wiper unit, a lever adapted to be driven by said rotary disc so as to track said groove, and switching means adapted to switch over its state by the operation of said lever.

7. A wiper device according to claim 1, wherein said wiper motor unit incorporates a reduction gear constituted by a worm driven by said motor and a worm wheel driven by said worm, and said first and second switch means are provided on a surface of said worm wheel.

* * * * *